(12) United States Patent
Maduranthakam Kidambi Sridhar et al.

(10) Patent No.: US 11,714,919 B2
(45) Date of Patent: Aug. 1, 2023

(54) METHODS AND SYSTEMS FOR MANAGING THIRD-PARTY DATA RISK

(71) Applicant: PayPal, Inc., San Jose, CA (US)

(72) Inventors: Vaidehi Maduranthakam Kidambi Sridhar, Vellore (IN); Sri Harish Maduranthakam Kidambi Sridhar, Vellore (IN)

(73) Assignee: PAYPAL, INC., San Jose, CA (US)

( * ) Notice: Subject to any disclaimer, the term of this patent is extended or adjusted under 35 U.S.C. 154(b) by 274 days.

(21) Appl. No.: 17/018,971

(22) Filed: Sep. 11, 2020

(65) Prior Publication Data

US 2022/0083692 A1     Mar. 17, 2022

(51) Int. Cl.
  *G06F 21/62*     (2013.01)
  *G06F 21/64*     (2013.01)
  *G06F 16/951*    (2019.01)
  *H04L 9/08*      (2006.01)
  *G06Q 30/0282*   (2023.01)
  *G06Q 10/0635*   (2023.01)

(52) U.S. Cl.
  CPC ........ *G06F 21/6272* (2013.01); *G06F 16/951* (2019.01); *G06F 21/645* (2013.01); *G06Q 10/0635* (2013.01); *G06Q 30/0282* (2013.01); *H04L 9/0825* (2013.01)

(58) Field of Classification Search
  CPC .. G06F 21/6272; G06F 16/951; G06F 21/645; G06Q 10/0635; G06Q 30/0282; H04L 9/0825
  See application file for complete search history.

(56) References Cited

U.S. PATENT DOCUMENTS

| | | | | |
|---|---|---|---|---|
| 7,401,233 | B2* | 7/2008 | Duri | H04L 63/10 713/193 |
| 11,232,256 | B1* | 1/2022 | Pelta | G06Q 10/0635 |
| 2006/0253583 | A1* | 11/2006 | Dixon | H04L 67/02 709/225 |
| 2012/0173397 | A1* | 7/2012 | Elwell | G06Q 40/02 705/35 |
| 2012/0331567 | A1* | 12/2012 | Shelton | G06Q 10/00 726/28 |

(Continued)

OTHER PUBLICATIONS

Hamza Harkous, Kassem Fawaz, Remi Lebret, Florian Schaub, Kang G Shin, and Karl Aberer "Polisis: Automated analysis and presentation of privacy policies using deep learning", 27th USENIX Security Symposium. Aug. 15-17, 2018 • Baltimore, MD, USA, 531-548 (Year: 2018).*

(Continued)

*Primary Examiner* — Catherine Thiaw
(74) *Attorney, Agent, or Firm* — Haynes and Boone, LLP

(57) ABSTRACT

Some embodiments of the present disclosure disclose methods and systems for assessing the data risk management capabilities of data processors that receive second-party data as part of an engagement to provide support services. In some embodiments, the transfer of the second-party data to the data processors can be monitored to identify file transfers including unauthorized personally identifiable information (PII) attributes. In some embodiments, the database of the data processor may be scanned to locate any residual second-party data that should be removed after the data processor's engagement to provide the support services have expired.

20 Claims, 8 Drawing Sheets

(56) References Cited

U.S. PATENT DOCUMENTS

| | | | |
|---|---|---|---|
| 2015/0269391 A1* | 9/2015 | Ukil | G06F 21/6254 |
| | | | 726/30 |
| 2016/0164915 A1* | 6/2016 | Cook | H04L 63/04 |
| | | | 726/1 |
| 2020/0020008 A1* | 1/2020 | Barday | G06Q 10/063114 |
| 2020/0320418 A1* | 10/2020 | Aminian | G06N 5/048 |
| 2020/0387630 A1* | 12/2020 | Wandall | G06Q 30/0185 |
| 2021/0216656 A1* | 7/2021 | Xuan | G06F 21/44 |
| 2021/0390190 A1* | 12/2021 | Walker | G06Q 30/0236 |

OTHER PUBLICATIONS

Astrand Paer, Burger Armin, Eyraud Franck "EULA—End-User Licence Agreement—Satellite Remote Sensing Data", EU Joint Research Centre, 2012, 13 pages (Year: 2012).*

Ian Curry "Key Update and the Complete Story on the Need for Two Key Pairs", Entrust, 1998., 10 pages (Year: 1998).*

Aaron K Massey, Jacob Eisenstein, Annie I Anton, and Peter P Swire "Automated text mining for requirements analysis of policy documents". In 2013 21st IEEE International Requirements Engineering Conference (RE), pp. 4-13. IEEE (Year: 2013).*

59. Sebastian Zimmeck, Ziqi Wang, Lieyong Zou, Roger Iyengar, Bin Liu, Florian Schaub, Shomir Wilson, Norman Sadeh, Steven M. Bellovin, and Joel Reidenberg "Automated analysis of privacy requirements for mobile apps", In 2016 AAAI Fall Symposium Series. (Year: 2016).*

Tang Y, Lee PP, Lui JC, Perlman R. Secure overlay cloud storage with access control and assured deletion. IEEE Transactions on dependable and secure computing. Jul. 3, 2012;9(6):903-16 (Year: 2012).*

* cited by examiner

US 11,714,919 B2

METHODS AND SYSTEMS FOR MANAGING THIRD-PARTY DATA RISK

FIELD OF THE INVENTION

The present specification generally relates to the management of data privacy/security risk at a third-party, and more specifically, to determining the third-party has the capability to handle the risks associated with the data and to identifying residual files at the third-party that may contain such data.

BACKGROUND

In today's interconnected world of electronic transactions, organizations in possession of client data may provide the client data to third-party vendors that provide support services to the organizations and/or the clients. For example, an organization or company may provide its customer list to a vendor to perform know your customer (KYC) verification processes. If/when the information technology (IT) systems of such third-party vendors are breached and the organizations' client data are stolen or otherwise compromised, the organizations can be held legally liable for the breach, in addition to suffering reputational damages that accompany such breaches.

Further, once an organization's outsourcing engagement with vendors for the support services have ended, the vendors may not purge their systems to remove the client data that the organization provided as part of the engagement. Such practices are usually against the organization's wishes and may further expose the organization (and also the vendors) to unnecessary legal and reputational risks, as well as time and computing resources needed to address data being compromised, if the vendor's IT systems are breached. As such, there is a need for methods and systems that allow organizations to manage the aforementioned third-party data risks.

Figure 1:
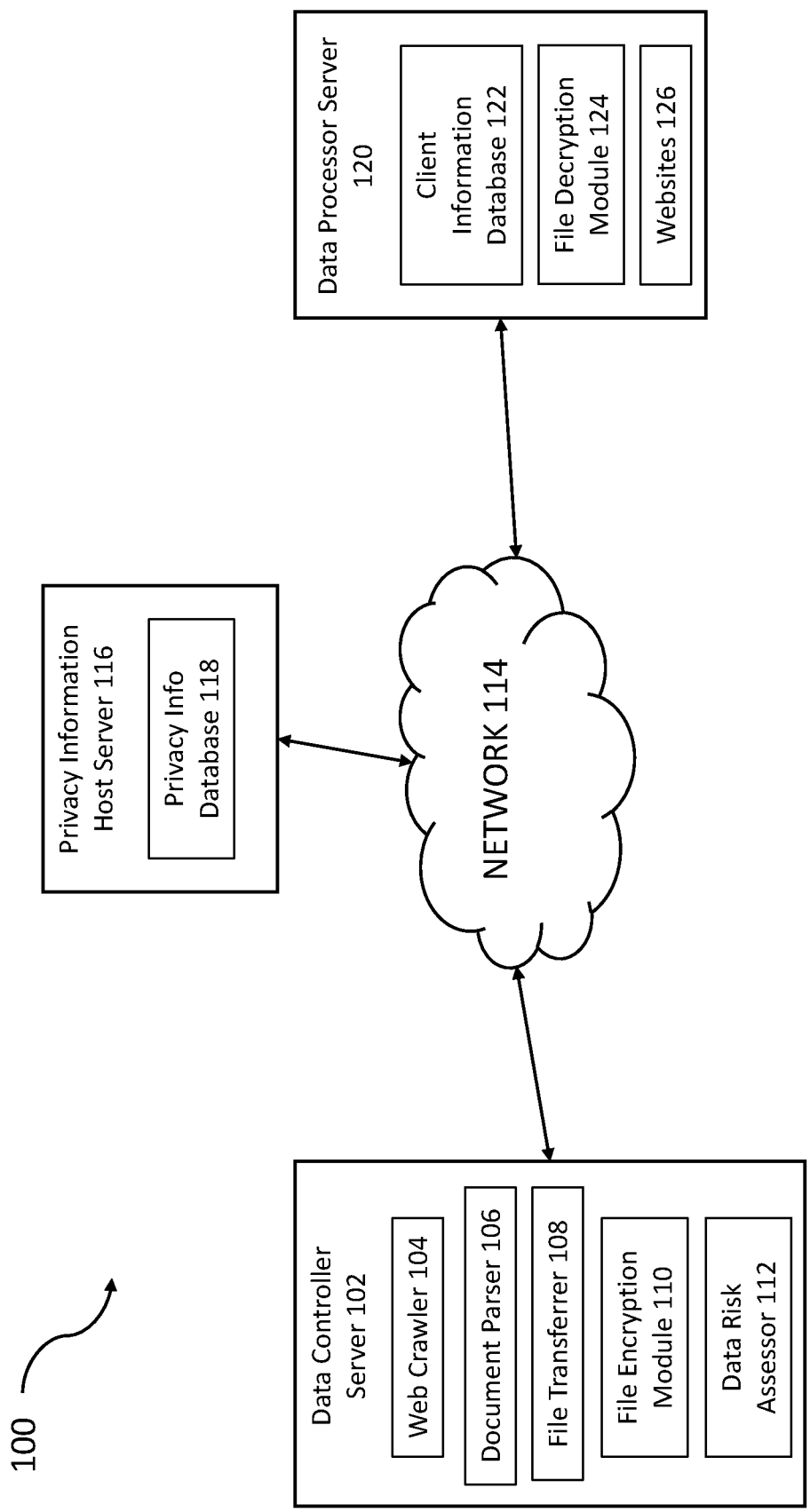
FIG. 1 is a block diagram of a networked system according to various aspects of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various features may be arbitrarily drawn in different scales for simplicity and clarity.

The present disclosure pertains to methods and systems for assessing the capabilities of a third-party (alternatively referred hereinafter as "data processor") to handle risks associated with second-party data that are provided by a first-party (alternatively referred hereinafter as "data controller") to the third-party as part of, for example, an outsourcing engagement. The disclosure also includes methods and systems for identifying files, during the transfer of the files to the third-party, that contain second-party data that are not authorized for transfer and are particularly risky if the security of the files is breached, examples of which include files containing attributes of personally identifiable information (PII) that are not scheduled to be transferred to the third-party as part of the outsourcing engagement. Further, the present disclosure includes methods and systems for identifying second-party data remaining at the storage systems of the third-party after the expiration date for the third-party to dispose of or return to the first-party the second-party data (e.g., after the expiration of the outsourcing engagement).

Current approaches that allow a data controller to evaluate the capabilities of a data processor to handle risks associated with receiving second-party data are expensive, time-consuming, error-prone and manual/laborious, because the approaches involve the data processor responding to lengthy questionnaires meant to gauge the data processor's data risk management capabilities and the data controller making decision about the data processor's data risk management capability based at least in part on the data processor's assertions in the questionnaires about its own capabilities. In contrast, the methods and systems disclosed in the present disclosure allow a data controller to perform an automatic evaluation of the data processor's data risk management capabilities without input from the data processor. For example, in some embodiments, the data controller may use a web crawler to scan the World Wide Web including websites of the data processor to obtain information related to the data processor's data risk management capabilities, such as but not limited to privacy statements, policies or agreements (e.g., end user license agreement (EULA)), legal declarations, news reports, etc., that pertain to the data processor's data risk management capabilities. The data controller can then perform, via a computing device, a data risk assessment of the data controller's data risk management capabilities without input from the data processor based on the obtained information.

In some embodiments, the computing device of the data controller may parse the obtained information to identify or isolate details pertinent to determining the data processor's data risk management capabilities. For example, the computing device may use a natural language processing (NLP) module to parse the obtained information for details related to the data risk management capabilities. For instance, the web crawler may have identified a section in the data processor's privacy statements that contains information about the data processor's policy of sharing received second-party data with external partners. As another instance, the web crawler may have identified portions of a legal declaration by the data processor containing information declaring the data processor's internal procedures and processes for safeguarding client data. In such cases, the NLP module may parse such information to extract relevant data for use by a data risk assessment module to evaluate the data risk management capability of the data processor, as discussed in detail below.

In some embodiments, a data controller may decide to engage a data processor for support services based on the results of the data risk evaluation. For example, the data risk assessment module may generate a data processor data risk assessment score or rating indicating that the data processor is qualified to handle data risks associated with the data controller providing a second-party's (e.g., a client's) data to the data processor. For example, the data controller may have in its possession the personal, medical, financial, etc. data of its clients and the data processor's data risk score or rating may indicate to the data controller that the data processor is qualified (e.g., has the proper procedures and safeguards) to handle risks associated with receiving such sensitive second-party data from the data controller as part of the outsourcing engagement. In such cases, the data controller may utilize a file transferrer to initiate the process of transferring files containing the noted data to the data processor.

In some embodiments, prior to transferring the files to the data processor, the data controller may wish to check that the files do not contain sensitive data beyond what is agreed upon as part of the outsourcing engagement. For example, there may be no need for the data processor to receive data having certain personally identifying information (PII) attributes of the second-party for the data processor to provide support services to the data controller. For instance, the support service can be a "know your customer" (KYC) support service where a data processor is engaged to ascertain membership status of a data controller's clients in some entity or organization. In such cases, the agreement or contract for the outsourcing engagement or support service may specify the only PII attribute (e.g., membership identification numbers) of the data controller's clients that should be transferred to the data processor when transferring the files to the data processor. That is, the only attribute of second-party PII declared by the agreement or contract as being appropriate for transferring to the data processor can be a client identification number. In such cases, the data controller may wish to check that the files being transferred to the data processor do not contain any more PII than the client identification numbers (e.g., do not contain names, birth dates, addresses, etc.).

In some embodiments, to check that the transferring files do not contain unauthorized PII, the data controller may use a computing device to extract, from the agreement or contract for the outsourcing engagement or support service, attributes of PII authorized (or unauthorized) to be included in the files that are scheduled to be transferred to the data processor. The data controller may then use a PII scanning module to scan the files during the transfer to identify those files, if any, that contain unauthorized PII, i.e., PII attributes that are not declared in the agreement or contract as appropriate or PII attributes that are declared in the agreement or contract as not appropriate for transferring to the data processor. In some embodiments, the PII scanning module may generate a PII oversharing alert when the PII scanning module detects files containing attributes of unauthorized PII being transferred to the data processor. With reference to the above example, the PII scanning module may scan the files during transfer to identify file transfers where the files contain attributes of PI different from membership identification numbers, such as but not limited to names, birth dates, addresses, social security numbers, etc. of the data controller's clients. In some embodiments, the PI scanning module may generate a PII under-sharing alert when the files being transferred to the data processor do not include sufficient or expected amount of authorized PII attributes.

In some embodiments, the PII scanning module may scan scripts of the file transferrer to determine whether the file transferrer is configured to facilitate or cause the transfer of files containing unauthorized PII attributes. In some embodiments, the PII scanning module may scan logs (e.g., job logs) of file transfers executed by the file transferrer to determine if the files transferred by the file transferrer contained unauthorized PII attributes. In some embodiments, the scans can be rule-based, i.e., the PII scanning module may have rules indicating to the PII scanning module how to identify unauthorized PII attributes in the scripts of the file transferrer or the logs of file transfers executed by the file transferrer. In some embodiments, the PII scanning module may be a machine learning or artificial intelligence (AI) engine configured to identify the unauthorized PII attributes in the scripts of the file transferrer or the logs of transfers executed by the file transferrer, for example, in comparison to the authorized PII attributes, as discussed in more detail below. In some embodiments, the PII scanning module may generate a PII oversharing alert when determining the file transferrer is scheduled to or has transferred files containing unauthorized PII. In some embodiments, the PII scanning module may generate a PII under-sharing alert when determining the file transferrer may not be configured to transfer, or has not transferred, files to the data processor containing sufficient or expected amount of authorized PII attributes.

In some embodiments, once the outsourcing engagement has expired or the need for the support service has ended, the data controller may wish to make sure that no second-party PII is left in the storage systems of the data processor. For example, the agreement or contract for the support service may require that the data processor properly dispose of or return to the data controller by some expiration date some or all of the second-party data that the data controller provided to the data processor as part of the outsourcing engagement. In some embodiments, the data controller may use a residual data scanning module to scan the databases of the data processor to identify any residual or leftover files or data containing PII of the second-party. In some embodiments, the residual data scanning module can be a machine learning or AI engine configured to identify PII attributes of files stored at databases being scanned by the module. In some embodiments, upon detecting a file with a PII of a second-party or client of the data controller, the residual data scanning module may generate a notice identifying the file for deletion or return to the data controller.

In some embodiments, the residual data scanning module may include an enumeration sub-module configured to identify various forms of data in the databases of the data processor. For example, the enumeration sub-module may be configured to identify files, tables, images, etc., in the data processor databases that may contain second-party PII attributes in the data. In some embodiments, the identified data may be injected into a scanning sub-module of the residual data scanning module to facilitate the identification of second-party PII attributes in the data. For example, the scanning sub-module may scan the data for the second-party PII attributes authorized for transfer to the data processor as part of the agreement or contract establishing the data controller's support service or outsourcing engagement with the data processor. In some embodiments, the residual data scanning module may also include a scoring sub-module configured to provide a score quantifying the probability that the scanned data contains the PII attributes. In some embodiments, the residual data scanning module may also include a decision making sub-module configured to make a determination about whether the injected data contains the PII attributes of the second-party based on the score provided by the scoring sub-module (e.g., a score of 75% or above may be taken as an indication that the injected data contains PII attributes). In some embodiments, the residual data scanning module may also include a reporting sub-module configured to generate a notice identifying the residual data for deletion or return to the data controller for having second-party PII attributes. In some embodiments, the residual data scanning module may include a scheduler configured to schedule (e.g., automatically and continuously) the residual data scanning of the data processor databases.

FIG. 1 is a block diagram of a networked system 100 suitable for managing third-party data risk according to an embodiment. Networked system 100 may comprise or implement a plurality of servers and/or software components that operate to perform various payment transactions or processes. Exemplary servers may include, for example, stand-alone and enterprise-class servers operating a server OS such as a MICROSOFT™ OS, a UNIX™ OS, a LINUX™ OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

In some embodiments, the system 100 may include a data controller server 102, a data processor server 120 and a privacy information host server 116 that are in communication with one another over a network 114. The data controller server 102, the data processor server 120 and the privacy information host server 116 may each include one or more electronic processors, electronic memories, and other appropriate electronic components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 114. Although only one of each data controller server 102, a data processor server 120 and a privacy information host server 116 are shown, there can be more than one of each server.

In some embodiments, the network 114 may be implemented as a single network or a combination of multiple networks. For example, in various embodiments, network 114 may include the Internet or one or more intranets, landline networks, wireless networks, and/or other appropriate types of networks. In another example, the network 114 may comprise a wireless telecommunications network (e.g., cellular phone network) adapted to communicate with other communication networks, such as the Internet.

In some embodiments, the data controller server 102 may be maintained by a first-party (referred herein as a data controller) that obtains second-party data in the course of rendering service to a second-party and further provides the second-party data to a third-party (referred herein as data processor) for support service or outsourcing purposes. For example, the data controller can be a payment provider such as PayPal™, Inc. of San Jose, Calif., the second-party can be customers of the data controller. In some embodiments, the data controller server 102 may include a web crawler 104 (e.g., also known as web spider) that may be configured to automatically scan data sources such as websites on the world wide web to retrieve relevant documents or data. For example, the web crawler 104 may automatically scan the websites 126 of the data processor at the data processor server 120 in search of documents related to the data risk management capabilities of the data processor. For instance, the web crawler 104 may scan the websites 126 to retrieve privacy policies or statements (e.g., end user license agreements (EULAs)) of the data processor. As another example, the web crawler 104 may automatically scan privacy information database 118 hosted on privacy information host server 116 to retrieve documents that may be germane to determine the data risk management capabilities of the data processor. For example, the privacy information database 118 may be a database of a government entity, an advocacy organization, journalistic entity, etc. that may include documents about the data processor's data risk management history and/or legal declarations, and the web crawler 104 may automatically scan privacy information database 118 to retrieve such documents or data.

In some embodiments, the data controller server 102 may include a document parser 106 that is configured to parse the documents and data retrieved by the web crawler 104. For example, the document parser 106 can be or can include a natural language processing (NLP) module including one or more software applications or software programs that can be automatically executed (e.g., without needing explicit instructions from a human user) to perform certain tasks. For instance, the NLP module can be configured to analyze the retrieved documents and data using a counters technique, a term frequency-inverse document frequency (TF-IDF) technique, a word2vec technique, etc. to extract information related to the data risk management capabilities of the data processor. In some embodiments, the document parser 106 may parse the documents for any information that can be used to determine or estimate the data processor's capabilities to properly manage (e.g., prevent breaches or compromises) risks to client or second-party data.

The details of the NLP analysis will now be discussed in more detail. As non-limiting examples, the NLP analysis may be performed using a counters technique, a term frequency-inverse document frequency (TF-IDF) technique, a word2vec technique, or combinations thereof. The counters technique, as the name suggests, counts the number of a variety of objects in the textual data obtained from a user. The objects may be words, types of words (e.g., nouns, verbs, adjectives, pronouns, adverbs, etc.), symbols (e.g., dollar sign, percentage sign, asterisk, etc.), punctuation marks, typographical errors, or even emojis. In other words, the textual data of a user may be analyzed by the counters technique to determine the number of total words, the number of nouns, the number of verbs, the number of adjectives, the number of pronouns, the number of adverbs, the number of punctuation marks, the number of symbols, the number of typographical errors, or the number of emojis. As a simplified example, the textual data may comprise, "Here is the $20 I owe you for lunch. I really enjoyed that berger. We need to do that again sooon!" Using the counters technique, the NLP module 200 may determine that there are 21 total words in the analyzed textual data, 4 pronouns, 2 typographical errors (e.g., "berger" and "sooon"), 1 symbol (e.g., the dollar sign), 3 punctuation marks, and 0 emojis.

In comparison to counters, when the TF-IDF technique is applied to the textual data of a given user, it generates a numerical statistic that reflects the importance of a word to that user, relative to other users. As such, the TF-IDF technique may be used to assign weights to different words of the user. A TF-IDF weight may be composed of two terms: TF (term frequency) and IDF (inverse document frequency). The first term (TF) computes the normalized term frequency, which may refer to the number of times a word appears in a given user's textual data, divided by the total number of words in the textual data. Expressed mathematically, TF=(number of times a particular word appears in the textual data of a user)/(total number of words in the textual data). The second term (IDF) computes, as a logarithm, the number of the users in a group of users divided by the number of users whose corresponding textual data contains the specific word. Expressed mathematically, IDF=log_e(total number of users/number of users whose textual data contains the particular word).

To illustrate TF-IDF with simplified real world examples, a word such as "stocks" may be used frequently by many users, so even if it is also used frequently by the applicant user, it is not assigned a high weight. However, if the user is frequently using the word "NASDAQ", not only in comparison to the general population of users, but also in relation to how often the user uses words such as "stocks", "DOW", or "S&P500", then the word "NASDAQ" may be assigned a higher weight for the applicant user. This is because the frequent usage of the word "NASDAQ" according to the applicant user's language patterns indicates that it is of particular importance to the applicant user. For example, the applicant user may be more interested in trading technology stocks than stocks in general. As another example, if the word "coke" appears frequently in the applicant's textual data, it may not be weighed very heavily, since many other users may buy or consume Coke™ as well. However, if a word corresponding to a particular hair product (e.g., "L'Oreal") frequently appears in the textual data of the applicant user, it may be assigned a higher weight, because it may indicate a particular brand loyalty of the applicant user or the price range with which the applicant user is comfortable.

Word2vec is yet another way of analyzing the language usage patterns of a user. In more detail, word2vec is a neural net that processes textual data by vectorizing words. For example, an input of a word2vec process may be a body of text (e.g., a particular user's textual data aggregated over a period of time), and an output of the word2vec process may be a set of vectors, for example feature vectors that represent words in that body of text. Therefore, for a given user's textual data, each word in the textual data may have a corresponding vector, and the entirety of the textual data of that user may be represented as a vector-space.

Word2vec may be useful because it can group the vector representations of similar words together in a vector-space, for example, the words "dog" and "cat" may be closer together in vector-space than the words "dog" and "aspirin". This may be done by detecting their similarities mathematically, since mathematical operations may be performed on or using vectors. In this manner, word2vec allows mathematical processing (which is very convenient for computers) on human language data, which may make word2vec well-suited for machine learning. In a simplified example, via the application of word2vec, the words "man", "woman", "king", and "queen" may each have a respective vector representation. By subtracting the vector representation of "man" from the vector representation of "king", and then adding the vector representation of "woman", the result is the vector representation of "queen." Note that the word2vec needs to be trained for a particular context, because different words or objects may mean different things in different contexts.

In some embodiments, the data controller server 102 may include a data risk assessor 112 configured to evaluate the data risk capabilities of the data processor and/or the risk to the second-party data based on the information parsed by the document parser 106. For example, the data risk assessor 112 may calculate or estimate a risk assessment score or rating to the second-party data based on the information retrieved by the web crawler 104 and parsed by the document parser 106. For example, the web crawler 104 may have retrieved a EULA from the websites 126 or a data processor's legal declaration from the privacy information database 118, and the document parser 106 may have parsed the EULA and/or the legal declaration to determine that the data processor may have repeated data privacy violations and lacks acceptable data privacy protection procedures. In some cases, based on such determinations, the data risk assessor 112 may then calculate a risk assessment score or rating indicating the data processor's capability, or lack thereof, to manage risks to the second-party data of the data controller.

In some embodiments, the data controller server 102 may include a file transferrer 108 configured to transfer files from the data controller server 102 to the data processor server 120. For example, the data controller may engage the data processor to provide support services to the data controller's clients, and may have to provide files containing the customer's data (e.g., the afore-mentioned second-party data) to the data processor. In such embodiments, the data controller server 102 may use a file transferrer 108 such as but not limited to file transfer protocol (FTP) servers, file sharing platforms or services (e.g., control-M managed file transfer), etc. to transfer the files containing the second-party data. In some embodiments, the file transferrer may include a transfer job scheduler configured to automatically schedule the transfer of the second-party data to the data processor.

In some embodiments, the data controller server 102 may include a file encryption module 110 configured to encrypt the files being transferred to the data processor server 120 by the file transferrer 108. The file encryption module 110 may include one or more software applications or software programs that can be automatically executed (e.g., without needing explicit instructions from a human user) to perform certain tasks. As noted above, the files may include highly sensitive second-party data including but not limited to personal, financial and/or medical information of the second-party, a breach or compromise of which may cause the data controller (and in some cases, the data processor) to face legal liability and suffer reputational damage. As such, the data controller may wish to protect the second-party data from any breach or compromise during the transfer of the second-party data, and may encrypt the data using a file encryption module 110 prior to transferring to the second-party data processor server 120. In some instances, the file encryption module 110 can be a symmetric or asymmetric encryption module. With respect to the former, the encryption key is the same as the decryption key, and as such, the data controller may provide the key used to encrypt the files to the data processor for use in decrypting the encrypted files. With respect to the latter, the public key used to encrypt the files is different from the secret key to be used for decrypting the files, and the data controller may provide the secret key to the data processor confidentially.

The data processor server 120 may be maintained by the third-party that receives the second-party data from the data controller and provides the support services as part of an outsourcing agreement. With the reference to the above example, if the data controller is a payment provider, the data processor can be a specialized vendor qualified to provide support services such as performing "know your customer (KYC)" background checks on the payment provider's customers, i.e., on the second-parties. In such cases, the data processor may receive from the data controller the second-party data that the data processor may use in providing the support service. In some embodiments, the data processor server 120 may include a client information database 122 configured to store the second-party data at the data processor server 120.

In some embodiments, the data processor server 120 may host websites 126 that contain information about the data processor's policies, privacy statements, etc. related to the data processor's data risk management capabilities. For example, the websites 126 may contain the data processor's end user license agreements (EULAs) that underlie the support services that the data processor provide. As another example, the websites 126 may contain the data processor's privacy policies or statements related to the data processor's procedures for handling client data (e.g., such as the second-party data provided by the data controller). In some cases, the websites 126 can be publicly available, and as such a web crawler 104 may be able to locate the websites 126 and retrieve the documents or data hosted thereon.

In some embodiments, the data processor server 120 may include a file decryption module 124 configured to decrypt encrypted files received from the file transferrer 108. The file encryption module 110 may include one or more software applications or software programs that can be automatically executed (e.g., without needing explicit instructions from a human user) to perform certain tasks. For example, if the received files are symmetrically encrypted, the file encryption module 110 may use the same encryption key used to encrypt the files to decrypt the files. As another example, the received filed may have been asymmetrically encrypted and the data processor may have received secretly the secret key for decrypting the encrypted files. In such cases, the file encryption module 110 may use the secret key to decrypt the encrypted files.

In some embodiments, the privacy information host server 116 may be maintained by an entity tasked with maintaining information about the data privacy capabilities and history of the data processor. For example, the privacy information host server 116 may be maintained by a privacy advocacy organization, a governmental entity, a journalistic entity, etc. that monitor and document the history and/or statements of the data processor related to data privacy. For instance, the privacy information host server 116 may be maintained a governmental entity that receives and stores in the privacy information database 118 legal declarations from data processors about their capabilities and track records related to safeguarding customers' sensitive data. As another instance, the privacy information host server 116 may be maintained a journalistic entity that documents and stores in the privacy information database 118 the data processor's history of handling customers' sensitive data. In some cases, the privacy information host server 116. In some cases, the privacy information database 118 can be publicly available, and as such a web crawler 104 may be able to locate the privacy information database 118 and retrieve the documents or information stored thereon.

Figure 2:
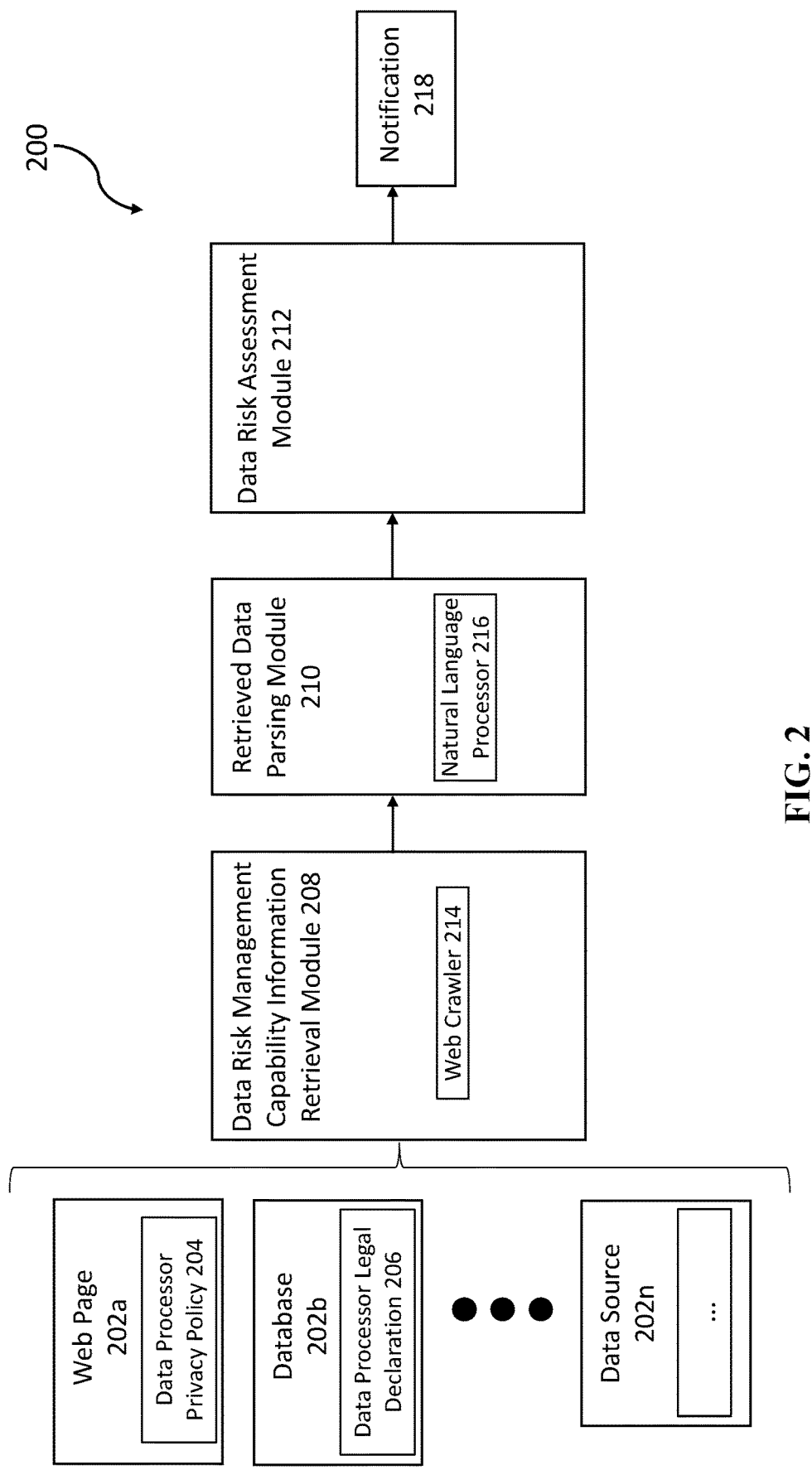
FIG. 2 is a block diagram illustrating a process of performing a third-party data risk assessment according to various aspects of the present disclosure.

FIG. 2 is a block diagram 200 illustrating a process of performing a third-party data risk assessment according to various aspects of the present disclosure. In some embodiments, a data controller may wish to engage a data processor to provide support service to the data controller's clients, and may need to provide the clients' data (e.g., second-party data) to the data processor. In such cases, the data controller may wish to make sure that the data processor has at least the minimum level of capabilities to manage risks to the second-party data, such as but not limited to breaches, hacking, ransomware compromises, etc. In some embodiments, the data controller may send a detailed questionnaire to the data processor requesting information about the data processor's data risk management capabilities. For example, such questionnaires may inquire about the data processor's policies about client data privacy, safeguards to protect second-party data, etc. In some embodiments, instead of or in addition to requesting such information from the data processor, the data controller may wish to determine, for example, based on available or public data, the data risk management capabilities of the data processor (i.e., without any input from the data processor).

In some embodiments, the data processor may include a data risk management capability information retrieval module 208 having a web crawler 214 (e.g., similar to the web crawler 104). In some cases, the data risk management information capability retrieval module 208 may include one or more software applications or software programs (e.g., web crawler 214) that can be automatically executed (e.g., without needing explicit instructions from a human user) to perform certain tasks, such as but not limited to crawling, spidering or scraping the world wide web to locate and retrieve relevant documents. In some cases, the data processor may use the web crawler 214 to retrieve documents relevant to the data processor's data risk management capabilities from various data sources 202a-202n, such as but not limited to web pages 202a hosted on a server of the data processor (e.g., 120), databases 202b maintained on a server of a privacy information host server (e.g., 116), etc. For example, the data processor may have a webpage 202a containing the data processor's privacy policy/statements 204 that is publicly available or to which the data controller has access, and the web crawler 214 of the data controller may crawl throughout the world wide web to locate the webpage 202a and retrieve the privacy policy/statements 204. As another example, a privacy information host server may have a database 202b containing legal declarations 206, news reports, research articles, etc., about the data processor's data risk management capabilities. In some cases, the database 202b can be publicly available or the data controller may have access to the database 202b, and the web crawler 214 of the data controller may crawl throughout the world wide web to locate the database 202b and retrieve the legal declarations 206, news reports, research articles, etc., relevant to the data processor's data risk management capabilities.

In some embodiments, the web crawler 214 may use key word searches to identify the documents that contain information related to the data processor's data risk management capabilities. In some embodiments, the web crawler 214 may include a machine learning component configured to execute a machine learning process on the documents located at the data sources 202a-202n. For example, the machine learning component may be pre-trained to identify documents including information about a data processor's data risk management capabilities, and the web crawler 214 may use the machine leaning component to identify relevant privacy policy/statements in the webpage 202a and legal declarations 206, news reports, research articles, etc., related to data risk management capabilities in the database 202b.

In some embodiments, the machine learning component employs a decision tree learning model to conduct the machine learning process. A decision tree learning model uses observations about an item (represented by branches in the decision tree) to make conclusions about the item's target value (represented by leaves in the decision tree). As non-limiting examples, decision tree learning models may include classification tree models, as well as regression tree models. In some embodiments, the machine learning component employs a Gradient Boosting Machine (GBM) model (e.g., XGBoost) as a regression tree model. The GBM model may involve the following elements: 1. A loss function to be optimized; 2. A weak learner to make decisions; and 3. An additive model to add weak learners to minimize the loss function. It is understood that the present disclosure is not limited to a particular type of machine learning. Other machine learning techniques may be used to implement the machine learning component, for example via Random Forest or Deep Neural Networks.

In some embodiments, the data processor may include a retrieved data parsing module 210 (e.g., similar to document parser 106) configured to extract from the retrieved privacy policy/statements, legal declarations, news reports, research articles, etc., information related to the data risk management capabilities of the data processor. For example, the retrieved data parsing module 210 may include one or more software applications or software programs (e.g., natural language processing (NLP) sub-module 216) that can be automatically executed (e.g., without needing explicit instructions from a human user) to perform certain tasks, such as but not limited to extracting from the retrieved documents (e.g., privacy policy/statements, legal declarations, news reports, research articles, etc.) information related to the data risk management capabilities of the data processor. For example, the retrieved privacy policy/statement can be an end user license agreement (EULA) of the data processor including details about how the data processor handles client or second-party data, and the NLP sub-module 216 may process the EULA to learn about the data risk management capabilities of the data processor. Examples of such details include the security procedures and/or infrastructure used by the data processors to store and/or share second-party data, procedures or processes for handling data security breaches or compromises, etc. In some embodiments, the NLP sub-module 216 may include a machine learning component configured to execute a machine learning process on the retrieved documents. For example, the machine learning component may be pre-trained to with sample privacy policy/statements, legal declarations, news reports, research articles, etc. to identify and extract information about a data processor's data risk management capabilities, and the NLP sub-module 216 may identify and extract such information from the retrieved documents.

In some embodiments, the data processor may include a data risk assessment module 212 (e.g., similar to data risk assessor 112) configured to intake the extracted information from the retrieved data parsing module 210 and determine whether the data processor has at least an acceptable level of data risk management capability to manage the risk to the second-party data to be provided by the data controller to the data processor. For example, the data risk assessment module may calculate a data risk assessment score or rating qualifying the data processor's data risk management capability based on the extracted information. The data risk assessment module can compute the data risk assessment score or rating by quantifying the level of the data processor's data risk management capabilities found in the extracted information with respect to benchmarks of some data risk management capability standard.

For example, the extracted information may indicate that the data processor's data privacy policy complies with some but not all benchmarks of some data privacy standard. Further, the extracted information may indicate that the data processor has poor track record of securely handling client's data. In addition, the extracted information may indicate that the data processor has state of the art client data storage and processing infrastructure. In such cases, the data risk assessment module may assign scores (e.g., normalized) to each aspect of the data processor's data risk management capabilities and average these scores (e.g., as a weighted sum) to calculate the data risk assessment score or rating. It is to be noted that the above discussion of how to calculate the data risk assessment score or rating is a non-limiting example, and any other method that generates a score, rating or grade that quantifies or measures the data risk management capability of the data processor based on the extracted information is equally applicable.

In some embodiments, after generating the data risk assessment score or rating, the data risk assessment module 212 may compare the generated data risk assessment score or rating to a threshold data risk assessment score or rating to determine whether the data processor has the requisite data risk management capability. In some cases, if the comparison indicates that the data processor in fact possesses the requisite data risk management capability, the data risk assessment module 212 may generate a notification 218 for the data controller to inform the data controller that the second-party data can be transferred to the data processor. On the other hand, if the comparison indicates that the data processor does not possess the requisite data risk management capability, the data risk assessment module 212 may generate an output 218 for the data controller to inform the data controller that the second-party data should not be transferred to the data processor.

Figure 3:
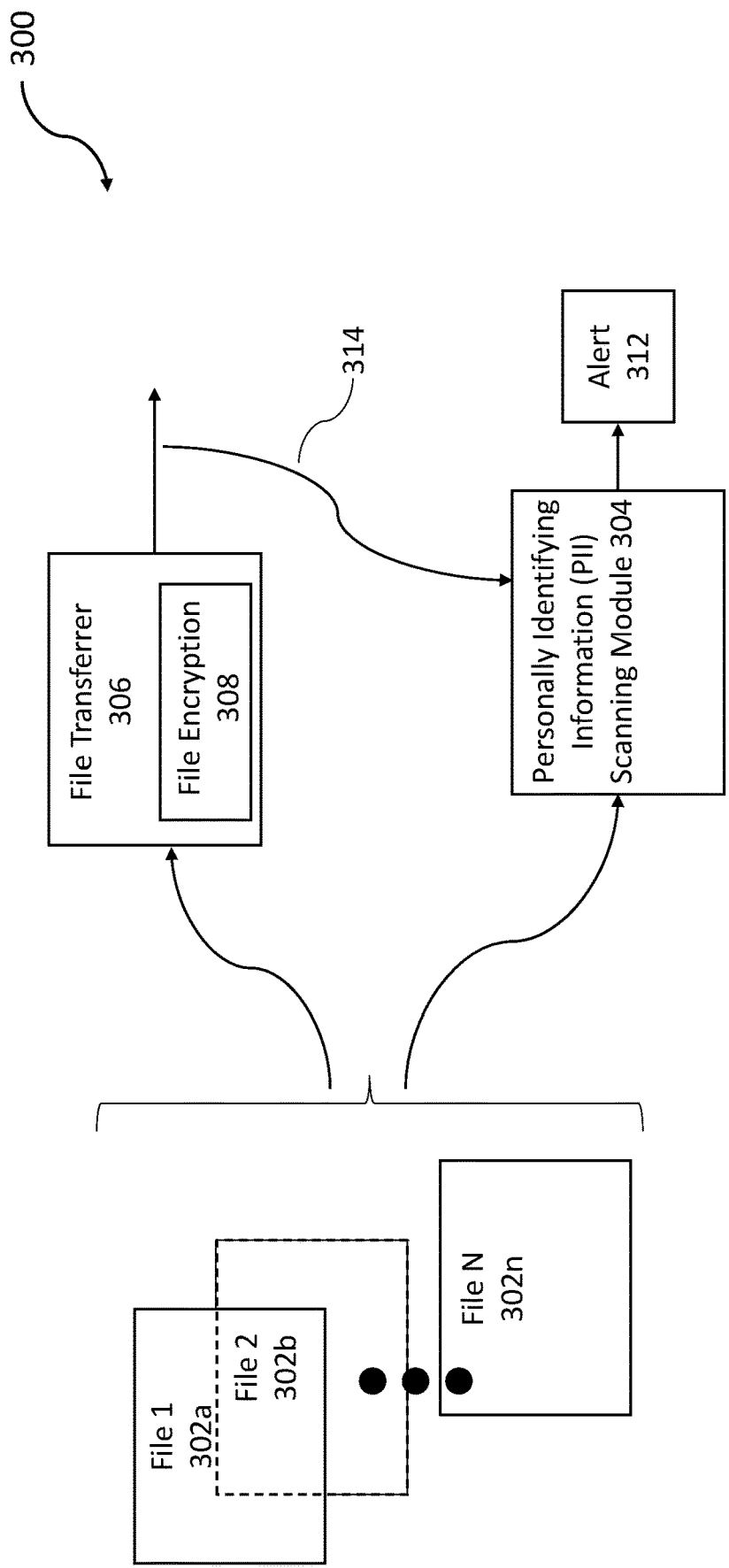
FIG. 3 is a block diagram illustrating a process of identifying personally identifying information (PII) in files being transferred to a third-party according to various aspects of the present disclosure.

FIG. 3 is a block diagram 300 illustrating a process of identifying personally identifying information (PII) in files being transferred to a third-party according to various aspects of the present disclosure. In some embodiments, the data controller may wish to transfer second-party data to the data processor, for example, after receiving a notice from the data risk assessment module 212 that the data processor has the requisite data skill management capabilities to properly handle the second-party data. In some cases, the second-party data may be the data of the controller's clients that may have to be transferred to the data processor so that the data processor can provide support service to the data controller (and the clients). For example, as discussed above, the data controller can be a payment services provider and the second-party data can be personal and financial information of the clients that the data processor may need to perform KYC background checks on the clients for the data controller. In general, the second-party data can include PII of the clients, including but not limited to the clients' personal, financial, health, etc., information.

In some embodiments, prior to transferring the second-party data, the data controller may perform a privacy impact assessment to identify second-party PII attributes that may be (or prohibited to be) transferred to the data processor as part of the transfer of the second-party data. The privacy impact assessment may include analyzing the outsourcing agreement between the data controller and the data processor for the support services and determining or extracting from the agreement the PII attributes that may have to be included in the files to be transferred. With reference to the above example, a privacy impact assessment may determine that PII attributes that are personal or financial, but not health related, may be included in the files to be transferred (or are not to be transferred) for KYC background check purposes. As such, for instance, the privacy impact assessment may extract from the outsourcing agreement PII attributes such as names, addresses, banking information, etc., as attributes authorized for inclusion in the files to be transferred (but not medical PII attributes, for example).

In some embodiments, a PII scanning module 304 may be used to check that no unauthorized PII attributes are included in files 302a-302n to be transferred to the data processor, i.e., PII attributes that are not determined by the privacy impact assessment to be part of the file transfer are included in the files 302a-302n to be transferred to the data processor or that no PII attributes identified as prohibited are not included in the files. In some cases, the PII scanning module 304 may include one or more software applications or software programs that can be automatically executed (e.g., without needing explicit instructions from a human user) to perform certain tasks, such as but not limited to scanning files 302a-302n to be transferred to the data processor for unauthorized PII attributes. In some embodiments, the PII scanning module 304 can be a rules-based engine configured to identify unauthorized PII attributes by comparing PII attributes in the files 302a-302n to the authorized PII attributes or unauthorized PII attributes (e.g., determined to be authorized or unauthorized according to the privacy impact assessment). For example, the rules may specify that files that include a health insurance or medical identification should not be transferred (i.e., those files are determined to contain an unauthorized PII attribute), and the rules-based engine may similarly generate an alert 312 notifying the data controller of an oversharing of PII when a file containing such a PII attribute is to be transferred to the data processor.

In some embodiments, the PII scanning module 304 may include an artificial intelligence (AI) engine or machine learning (ML) engine configured to identify files containing PII attributes unauthorized for transferring to the data processor. For example, the AI engine or ML engine may be pre-trained with a training set of files including PII attributes (e.g., authorized and/or unauthorized) to identify files that contain unauthorized PII attributes, and the PII scanning module 304 may be used during the transfer of files 302a-302n to identify those files that contain unauthorized PII attributes. Upon identifying files that contain unauthorized PII attributes, in some cases, the PII scanning module 304 may generate an alert 312 to notify the data controller of an oversharing of PII with the data processor.

In some embodiments, the machine learning engine employs a decision tree learning model to conduct the machine learning process. As non-limiting examples, decision tree learning models may include classification tree models, as well as regression tree models. In some embodiments, the machine learning engine employs a Gradient Boosting Machine (GBM) model (e.g., XGBoost) as a regression tree model. It is understood that the present disclosure is not limited to a particular type of machine learning. Other machine learning techniques may be used to implement the machine learning engine, for example via Random Forest or Deep Neural Networks.

In some embodiments, the PII scanning module 304 may also monitor 314 the file transfer process to determine if any of the files being transferred contain unauthorized PII attributes. For example, the data controller may use a file transferrer 306 such as but not limited to file transfer protocol (FTP) servers, file sharing platforms or services (e.g., control-M managed file transfer), file transferring applications, etc. to transfer the files 302a-302n. In such cases, the PII scanning module 304 may analyze the export scripts of the file transferrer to determine if the files being transferred include any unauthorized PII attributes. In some cases, the PII scanning module 304 may also analyze the job or server logs of the file transfer processes to determine if the transferred files included any unauthorized PII attributes. As discussed above, the PII scanning module 304 can be a rules-based engine or an AI/ML engine configured to identify files with unauthorized PII attributes in comparison to authorized PII attributes obtained from a privacy impact assessment of the agreement establishing the outsourcing engagement between the data controller and the data processor.

In some embodiments, the data controller may wish to encrypt the files 302a-302n to be transferred out to the data processor (e.g., to avoid breaches or hacking during the transfer process). As such, in some cases, the file transferrer 306 may include a file encryption module 308 configured to encrypt the files 302a-302n symmetrically or asymmetrically prior to the files' transfer to the data processor. For example, the file encryption module 308 may encrypt the files 302a-302n symmetrically by using a single secret key, and provide the same secret key to the data processor secretly so that the data processor can use the secret key to decrypt the encrypted files. In some cases, the file encryption module 308 may encrypt the files 302a-302n asymmetrically by using a public key of a public-private key pair to encrypt the files. In such cases, the data controller may provide the private key of the public-private key pair to the data processor secretly so that the data processor can use the private key to decrypt the encrypted files. In some embodiments, the secret key or the private key can be timed, i.e., the secret key or the private key may be configured to expire after a predetermined duration. For example, the duration can be for the period of the outsourcing agreement between the data controller and the data processor. In some cases, using a timed decryption key may enhance the security of the transferred files as the data processor or anyone else may not be able to decrypt the files after the expiration of the predetermined duration (e.g., after the data processor's services are no longer needed).

Figure 4:
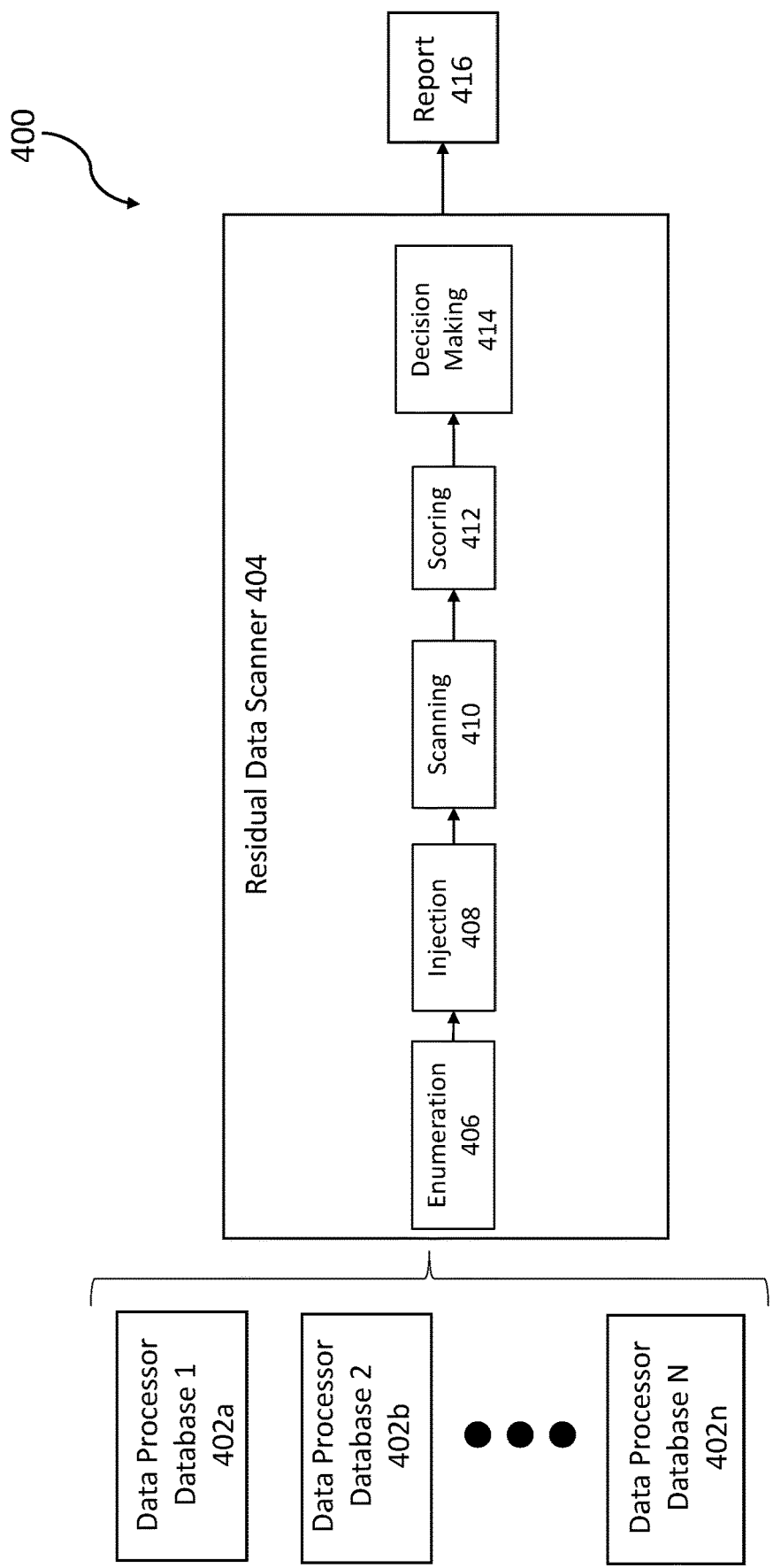
FIG. 4 is a block diagram illustrating a process of identifying files at a third-party database containing PII according to various aspects of the present disclosure.

FIG. 4 is a block diagram 400 illustrating a process of identifying files at a third-party database containing PII according to various aspects of the present disclosure. In some embodiments, as discussed above, the data controller may transfer to the data processor files containing second-party data which may include authorized PII attributes of the data controller's clients. After the data controller's outsourcing engagement with the data processor ends, in some instances, the data controller may wish to check that the data processor has returned all the transferred files or properly disposed of the files. That is, the data controller may wish to check that no residual second-party data including PII of the data controller's clients remain in the databases 402a-402n of the data processor, as any breach or compromise of the databases 402a-402n may expose the data controller to legal liability and reputational damage. As such, in some embodiments, the data controller may use a residual data scanner 404 to scan the data processor databases 402a-402n for any residual second-party data remaining in the databases 402a-402n after the outsourcing engagement between the data controller and the data processor has ceased (e.g., and the transferred files are supposed to have been removed from the databases 402a-402n by the data processor).

In some embodiments, the residual data scanner 404 can be an artificial intelligence (AI) or machine leaning (ML) engine configured to scan the databases and identify stored filed containing second-party data including PII of the second party. In some embodiments, the residual data scanner 404 may employ a decision tree learning model to conduct the machine learning process. As non-limiting examples, decision tree learning models may include classification tree models, as well as regression tree models. In some embodiments, the residual data scanner 404 can employ a Gradient Boosting Machine (GBM) model (e.g., XGBoost) as a regression tree model. In some embodiments, the residual data scanner 404 may be a machine learning engine utilizing random forest or deep neural networks algorithms.

In some embodiments, the residual data scanner 404 may enumerate 406 the databases 402a-402n to identify the various types of data (which may or may not include residual second-party data) stored therein. For example, the stored data may be stored as different types of files such as tables, images, etc., and the residual data scanner 404 may identify these types of the stored data and inject 408 the data into the residual data scanner 404 to scan for residual second-party data, if any. In some embodiments, the file types may already be known, and the residual data scanner may instead directly inject 408 the stored data into the residual data scanner 404. In some embodiments, the residual data scanner 404 may then scan the injected data to identify any residual second-party data including PII of the second-party. In some instances, the residual data scanner 404 may be an AI or ML engine pre-trained with a training data set of stored data to identify second-party data containing PII of the second-party. For example, samples of data with or without second-party data with PII may be used to pre-train the AI or ML engine to identify data that include second party PII, and the residual data scanner 404 may then scan the injected stored data of the databases 402a-402n to determine if the scanned data contain PII of the second-party.

In some embodiments, the residual data scanner 404 may assign a score to scanned data to indicate a confidence level of the residual data scanner 404 about the scanned data being a second-party data having PII of the second-party. For example, the residual data scanner 404 may discover that the scanned data contains PII, but the result of the scanning may be inconclusive as to whether the PII belongs to the second-party. In such cases, the residual data scanner 404 may assign a score that reflects the certainty about the scanned data having a PII but the uncertainty about whether the scanned data is second-party data. In some embodiments, based on the assigned score, the residual data scanner 404 may make a decision 414 as to whether scanned data should be considered as having a second-party data having a second party PII. For example, the residual data scanner 404 may decide a scanned data is a second-party data having a PII of the second party if the assigned score exceeds some threshold score. In such cases, the residual data scanner 404 may generate a report 416 to inform the data controller and/or the data processor that the scanned data needs to be reviewed further or to be removed from the databases 402a-402n for being second-party data with PII of the second party.

Figure 5:
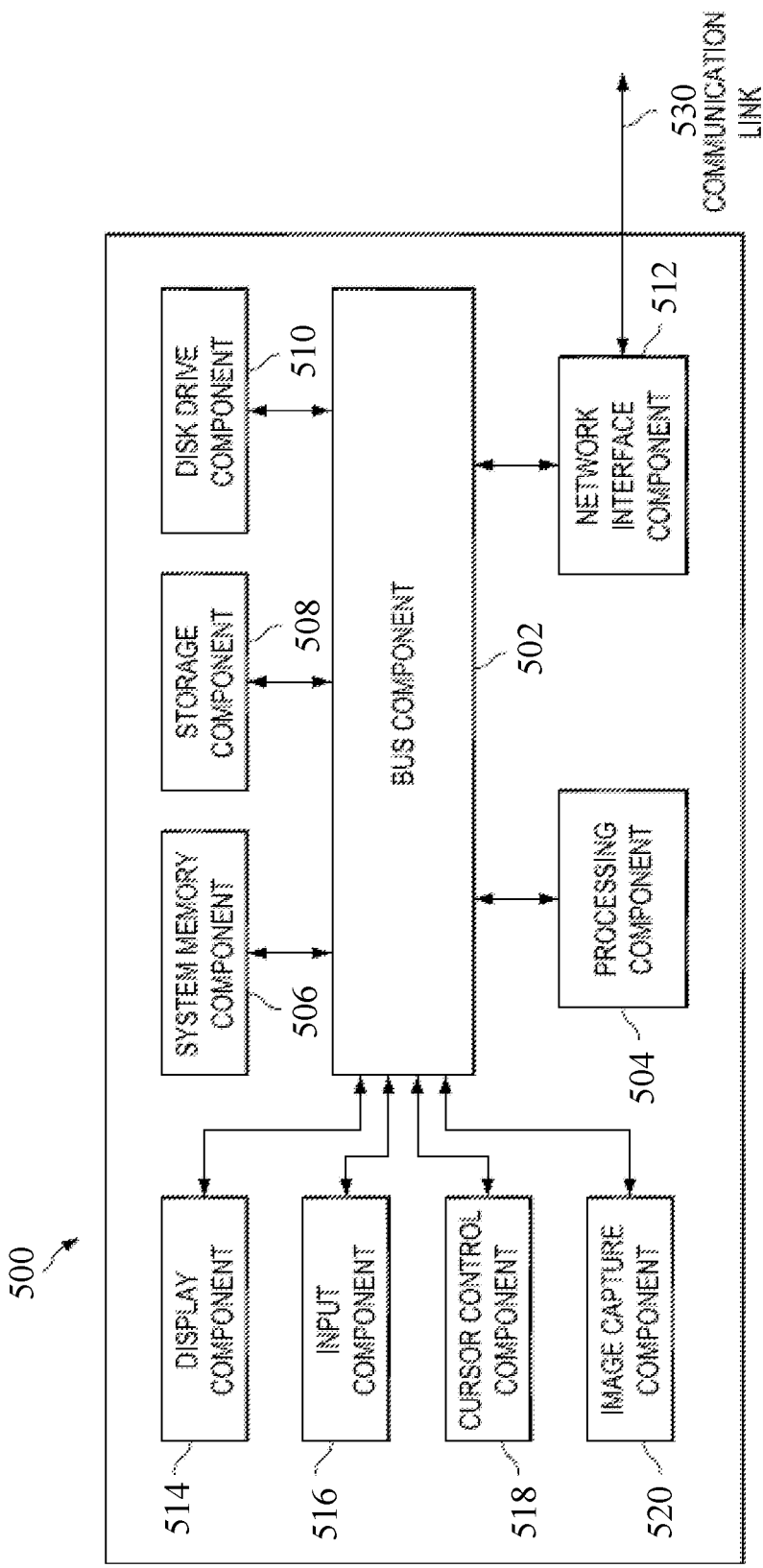
FIG. 5 is an example computer system according to various aspects of the present disclosure.

FIG. 5 is a block diagram of a computer system 500 suitable for implementing various methods and devices described herein, for example, the data controller server 102, the data processor server 120, the privacy information host server 116, the data risk management capability information retrieval module 208, the retrieved data parsing module 210, the data risk assessment module 212 and the PII scanning module 304. In various implementations, the devices capable of performing the steps may comprise a network communications device (e.g., mobile cellular phone, laptop, personal computer, tablet, etc.), a network computing device (e.g., a network server, a computer processor, an electronic communications interface, etc.), or another suitable device. Accordingly, it should be appreciated that the devices capable of implementing the aforementioned servers and modules, and the various method steps of the methods 600, 700 and 800 discussed below may be implemented as the computer system 500 in a manner as follows.

In accordance with various embodiments of the present disclosure, the computer system 500, such as a network server or a mobile communications device, includes a bus component 502 or other communication mechanisms for communicating information, which interconnects subsystems and components, such as a computer processing component 504 (e.g., processor, micro-controller, digital signal processor (DSP), etc.), system memory component 506 (e.g., RAM), static storage component 508 (e.g., ROM), disk drive component 510 (e.g., magnetic or optical), network interface component 512 (e.g., modem or Ethernet card), display component 514 (e.g., cathode ray tube (CRT) or liquid crystal display (LCD)), input component 516 (e.g., keyboard), cursor control component 518 (e.g., mouse or trackball), and image capture component 520 (e.g., analog or digital camera). In one implementation, disk drive component 510 may comprise a database having one or more disk drive components.

In accordance with embodiments of the present disclosure, computer system 500 performs specific operations by the processor 504 executing one or more sequences of one or more instructions contained in system memory component 506. Such instructions may be read into system memory component 506 from another computer readable medium, such as static storage component 508 or disk drive component 510. In other embodiments, hard-wired circuitry may be used in place of (or in combination with) software instructions to implement the present disclosure. In some embodiments, the various components of the data risk management capability information retrieval module 208, the retrieved data parsing module 210 and the data risk assessment module 212 may be in the form of software instructions that can be executed by the processor 504 to automatically perform context-appropriate tasks on behalf of a user.

Logic may be encoded in a computer readable medium, which may refer to any medium that participates in providing instructions to the processor 504 for execution. Such a medium may take many forms, including but not limited to, non-volatile media and volatile media. In one embodiment, the computer readable medium is non-transitory. In various implementations, non-volatile media includes optical or magnetic disks, such as disk drive component 510, and volatile media includes dynamic memory, such as system memory component 506. In one aspect, data and information related to execution instructions may be transmitted to computer system 500 via a transmission media, such as in the form of acoustic or light waves, including those generated during radio wave and infrared data communications. In various implementations, transmission media may include coaxial cables, copper wire, and fiber optics, including wires that comprise bus 502.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. These computer readable media may also be used to store the programming code for the data risk management capability information retrieval module 208, the retrieved data parsing module 210 and the data risk assessment module 212 discussed above.

In various embodiments of the present disclosure, execution of instruction sequences to practice the present disclosure may be performed by computer system 500. In various other embodiments of the present disclosure, a plurality of computer systems 500 coupled by communication link 530 (e.g., a communications network, such as a LAN, WLAN, PTSN, and/or various other wired or wireless networks, including telecommunications, mobile, and cellular phone networks) may perform instruction sequences to practice the present disclosure in coordination with one another.

Computer system 500 may transmit and receive messages, data, information and instructions, including one or more programs (i.e., application code) through communication link 530 and communication interface 512. Received program code may be executed by computer processor 504 as received and/or stored in disk drive component 510 or some other non-volatile storage component for execution. The communication link 530 and/or the communication interface 512 may be used to conduct electronic communications between the data controller server 102 and external devices, for example with the privacy information host server 116 and the data processor server 120, depending on exactly where the data controller server 102 is implemented.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as computer program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein. It is understood that at least a portion of the data risk management capability information retrieval module 208, the retrieved data parsing module 210 and the data risk assessment module 212 may be implemented as such software code.

Figure 6:
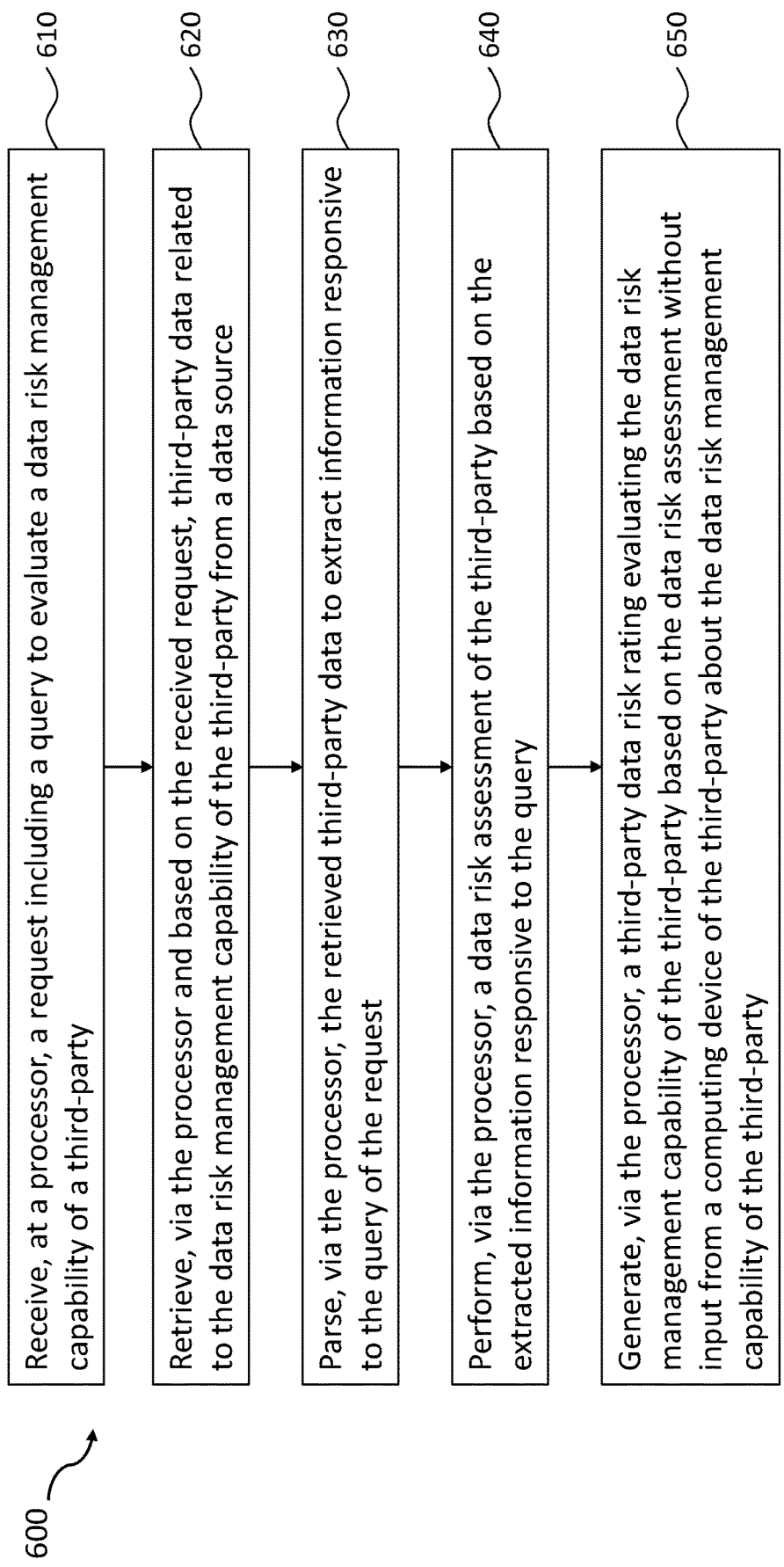
FIG. 6 is a flowchart illustrating a method of evaluating the data risk management capabilities of a third-party, according to various aspects of the present disclosure.

FIG. 6 is a flowchart illustrating a method 600 of evaluating the data risk management capabilities of a third-party, according to various aspects of the present disclosure. The various steps of the method 600, which are described in greater detail above, may be performed by one or more electronic processors, for example by the processors of a computer or server of a data controller transferring second-party data to a third-party (i.e., a data processor). In some embodiments, at least some of the steps of the method 600 may be performed by the data controller server 102 and/or the data risk management capability information retrieval module 208, the retrieved data parsing module 210 and the data risk assessment module 212 discussed above. Further, it is understood that additional method steps may be performed before, during, or after the steps 610-650 discussed below. In addition, in some embodiments, one or more of the steps 610-650 may also be omitted.

The method 600 includes a step 610 to receive, at a processor, a request including a query to evaluate a data risk management capability of a third-party.

The method 600 includes a step 620 to retrieve, via the processor and based on the received request, third-party data related to the data risk management capability of the third-party from a data source. In some embodiments, the data source is the World Wide Web and retrieving the third-party data includes web-spidering the World Wide Web. In some embodiments, the third-party data includes a publicly available privacy policy statement of the of the third-party related to the data risk management capability of the third-party. In some embodiments, the publicly available privacy policy statement includes an end user license agreement (EULA) of the third-party and/or a legal declaration of the third-party.

The method 600 includes a step 630 to parse, via the processor, the retrieved third-party data to extract information responsive to the query of the request. In some embodiments, the parsing the retrieved third-party data includes performing natural language processing of the retrieved third-party data to identify the information responsive to the query of the request.

The method 600 includes a step 640 to perform, via the processor, a data risk assessment of the third-party based on the extracted information responsive to the query.

The method 600 includes a step 650 to generate, via the processor, a third-party data risk rating evaluating the data risk management capability of the third-party based on the data risk assessment without input from a computing device of the third-party about the data risk management capability of the third-party.

In some embodiments, the method 600 also includes providing, via the processor, the data of the second-party to the third-party if the third-party data risk rating is no less than a threshold data risk rating indicating a minimal third-party data risk management capability, wherein the processor is of a first-party entrusted with data of a second-party. In some embodiments, the data of the second-party is asymmetrically encrypted with a keypair configured to expire within a pre-determined period.

One aspect of the present disclosure involves a system that includes a non-transitory memory and one or more hardware processors coupled to the non-transitory memory and configured to read instructions from the non-transitory memory to cause the system to perform operations comprising: receiving a request including a query to evaluate a data risk management capability of a third-party to provide data of a second-party to the third-party; web-crawling, based on the received request, the World Wide Web to retrieve third-party data related to the data risk management capability of the third-party; parsing the retrieved third-party data to extract information responsive to the query of the request; performing a data risk assessment of the third-party based on the extracted information responsive to the query; and providing the data of the second-party to the third-party based on the data risk assessment of the third-party.

Yet another aspect of the present disclosure involves a non-transitory machine-readable medium having stored thereon machine-readable instructions executable to cause a machine to perform operations comprising: receiving a request including a query to evaluate a data risk management capability of a third-party; retrieving, based on the received request, third-party data related to the data risk management capability of the third-party from a publicly available data source; natural language processing the retrieved third-party data to extract information responsive to the query of the request; performing a data risk assessment of the third-party based on the extracted information responsive to the query; augmenting the data risk assessment of the third-party with input from a computing device of the third-party about the data risk management capability of the third-party; and determining the data risk management capability of the third-party based on the augmented data risk assessment.

Figure 7:
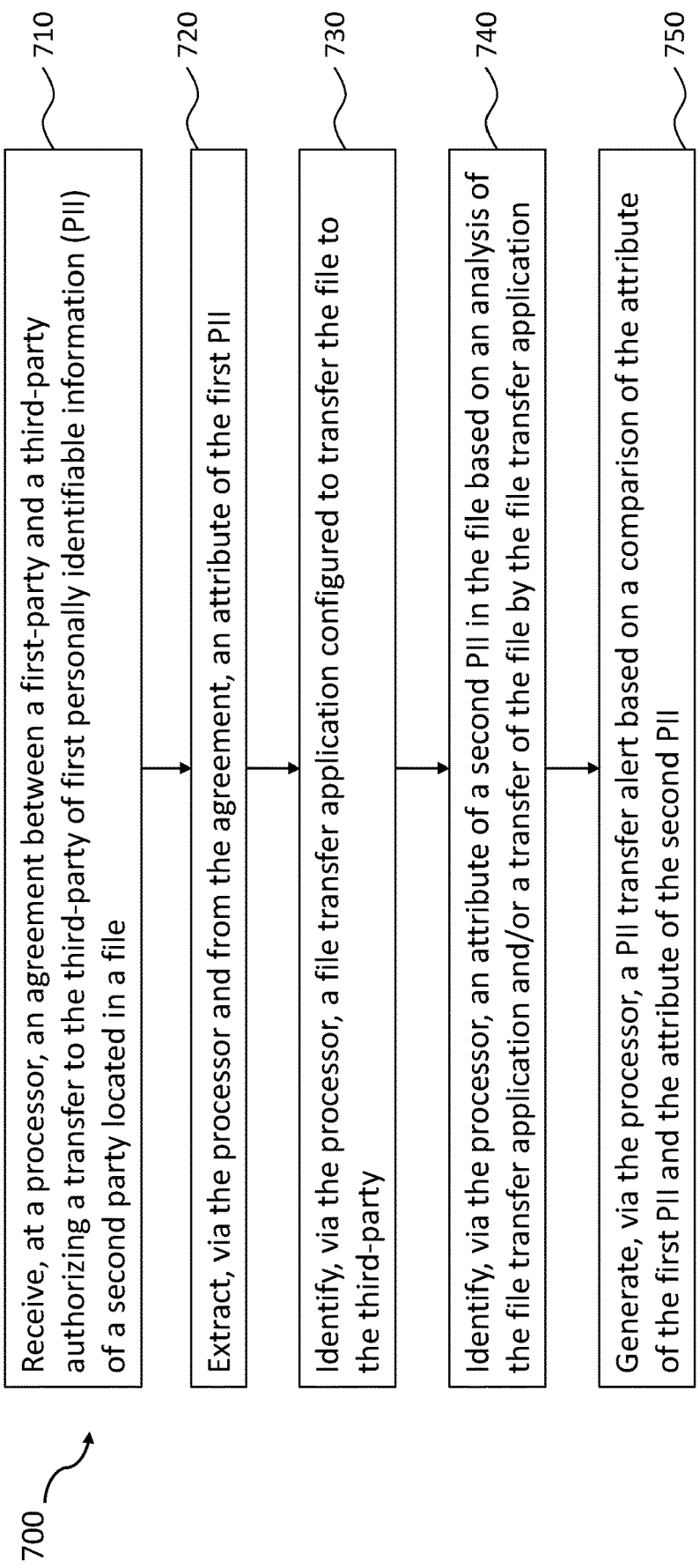
FIG. 7 is a flowchart illustrating a method of identifying PII in files being transferred to a third-party according to various aspects of the present disclosure.

FIG. 7 is a flowchart illustrating a method 700 of identifying PII in files being transferred to a third-party according to various aspects of the present disclosure. The various steps of the method 700, which are described in greater detail above, may be performed by one or more electronic processors, for example by the processors of a computer or server of a data controller transferring second-party data to a third-party (i.e., a data processor). In some embodiments, at least some of the steps of the method 700 may be performed by the data controller server 102 and/or the PII scanning module discussed above. Further, it is understood that additional method steps may be performed before, during, or after the steps 710-750 discussed below. In addition, in some embodiments, one or more of the steps 710-750 may also be omitted.

The method 700 includes a step 710 to receive, at a processor, an agreement between a first-party and a third-party authorizing a transfer to the third-party of first personally identifiable information (PII) of a second party located in a file.

The method 700 includes a step 720 to extract, via the processor and from the agreement, an attribute of the first PII.

The method 700 includes a step 730 to identify, via the processor, a file transfer application configured to transfer the file to the third-party.

The method 700 includes a step 740 to identify, via the processor, an attribute of a second PII in the file based on an analysis of the file transfer application and/or a transfer of the file by the file transfer application. In some embodiments, the identifying the attribute of the second PII in the file based on the analysis of the file transfer application and/or the transfer of the file by the file transfer application includes scanning an export script of the file transfer application. In some embodiments, the identifying the attribute of the second PII in the file based on the analysis of the file transfer application and/or the transfer of the file by the file transfer application includes scanning a log of the transfer of the file by the file transfer application. In some embodiments, the analysis of the file transfer application and/or the transfer of the file by the file transfer application is performed by an artificial intelligence (AI) engine trained on a training set of file transfer applications and/or logs of file transfers, respectively. In some embodiments, the AI engine includes a random forest machine learning engine.

The method 700 includes a step 750 to generate, via the processor, a PII transfer alert based on a comparison of the attribute of the first PII and the attribute of the second PII. In some embodiments, the PII transfer alert indicates an unauthorized transfer of the PII when the comparison indicates that the attribute of the second PII is different from any of the one or more attributes, wherein the attribute of the first PII includes one or more attributes of the first PII.

One aspect of the present disclosure involves a system that includes a non-transitory memory and one or more hardware processors coupled to the non-transitory memory and configured to read instructions from the non-transitory memory to cause the system to perform operations comprising: receiving, at a processor, an agreement between a first-party and a third-party authorizing a transfer to the third-party of first personally identifiable information (PII) of a second party located in a file; extracting, via the processor and from the agreement, an attribute of the first PII; identifying, via the processor, a file transfer application configured to transfer the file to the third-party; identifying, via the processor, an attribute of a second PII in the file based on an analysis of the file transfer application and/or a transfer of the file by the file transfer application; and generating, via the processor, a PII transfer alert based on a comparison of the attribute of the first PII and the attribute of the second PII.

Yet another aspect of the present disclosure involves a non-transitory machine-readable medium having stored thereon machine-readable instructions executable to cause a machine to perform operations comprising: receiving, at a processor, an agreement between a first-party and a third-party authorizing a transfer to the third-party of first personally identifiable information (PII) of a second party located in a file; extracting, via the processor and from the agreement, an attribute of the first PII; identifying, via the processor, a file transfer application configured to transfer the file to the third-party; identifying, via the processor, an attribute of a second PII in the file based on an analysis of the file transfer application and/or a transfer of the file by the file transfer application; and generating, via the processor, a PII transfer alert based on a comparison of the attribute of the first PII and the attribute of the second PII.

Figure 8:
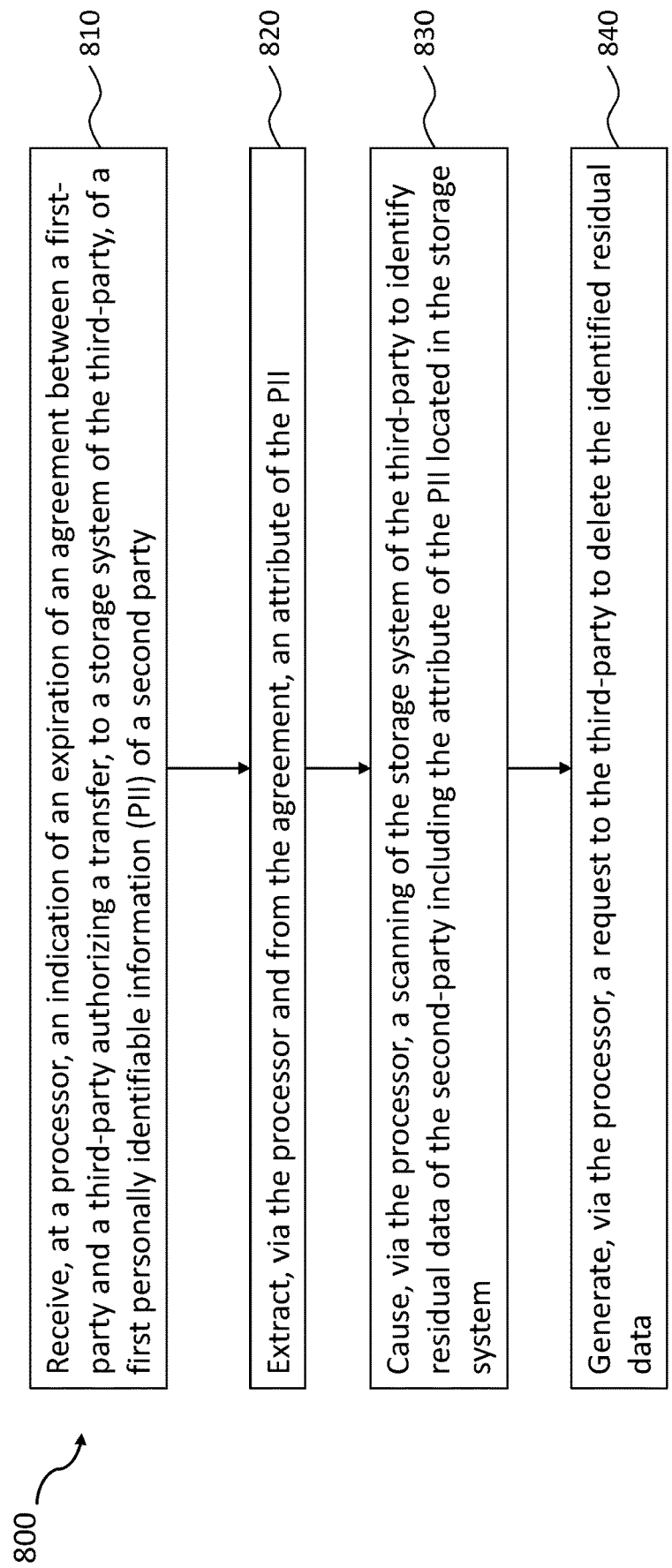
FIG. 8 is a flowchart illustrating a method of identifying files at a third-party database containing PII according to various aspects of the present disclosure.

FIG. 8 is a flowchart illustrating a method 800 of identifying files at a third-party database containing PII according to various aspects of the present disclosure. The various steps of the method 800, which are described in greater detail above, may be performed by one or more electronic processors, for example by the processors of a computer or server of a data controller transferring second-party data to a third-party (i.e., a data processor). In some embodiments, at least some of the steps of the method 800 may be performed by the data controller server 102 and/or the residual data scanner discussed above. Further, it is understood that additional method steps may be performed before, during, or after the steps 810-840 discussed below. In addition, in some embodiments, one or more of the steps 810-840 may also be omitted.

The method 800 includes a step 810 receive, at a processor, an indication of an expiration of an agreement between a first-party and a third-party authorizing a transfer, to a storage system of the third-party, of a first personally identifiable information (PII) of a second party.

The method 800 includes a step 820 to extract, via the processor and from the agreement, an attribute of the PII.

The method 800 includes a step 830 to cause, via the processor, a scanning of the storage system of the third-party to identify residual data of the second-party including the attribute of the PII located in the storage system. In some embodiments, the scanning of the storage system of the third-party is performed by an artificial intelligence (AI) engine trained on a training set of data including PIIs. In some embodiments, the AI engine includes a random forest machine learning engine.

One aspect of the present disclosure involves a system that includes a non-transitory memory and one or more hardware processors coupled to the non-transitory memory and configured to read instructions from the non-transitory memory to cause the system to perform operations comprising: receiving, at a processor, an indication of an expiration of an agreement between a first-party and a third-party authorizing a transfer, to a storage system of the third-party, of a first personally identifiable information (PII) of a second party; extracting, via the processor and from the agreement, an attribute of the PII; causing, via the processor, a scanning of the storage system of the third-party to identify residual data of the second-party including the attribute of the PII located in the storage system; and generating, via the processor, a request to the third-party to delete the identified residual data.

Yet another aspect of the present disclosure involves a non-transitory machine-readable medium having stored thereon machine-readable instructions executable to cause a machine to perform operations comprising: receiving, at a processor, an indication of an expiration of an agreement between a first-party and a third-party authorizing a transfer, to a storage system of the third-party, of a first personally identifiable information (PII) of a second party; extracting, via the processor and from the agreement, an attribute of the PII; causing, via the processor, a scanning of the storage system of the third-party to identify residual data of the second-party including the attribute of the PII located in the storage system; and generating, via the processor, a request to the third-party to delete the identified residual data.

Based on the above discussions, the present disclosure offers several significant advantages over conventional methods and systems. It is understood, however, that not all advantages are necessarily discussed in detail herein, different embodiments may offer different advantages, and that no particular advantage is required for all embodiments. One advantage is improved functionality of a computer. For example, conventional computer systems are only able to determine whether a data processor has at least sufficient data risk management capabilities simply based on responses provided by the data processor to questionnaires inquiring about the said capabilities. In contrast, the computer system of the present disclosure employs state-of-the-art web-spidering techniques to retrieve massive amount of documents from data sources such as the world wide web, state-of-the-art NLP techniques to analyze language patterns in the documents, and AI and/or machine learning to determine data risk management capabilities of the data processor (e.g., without any input from the data processor). This allows for more accurate and objective decisions to be made with respect to the data processor's data risk management capabilities while massively decreasing the inefficiencies inherent in the manual and labor-intensive processes that depend on a data processor's questionnaire responses to make determinations about the data processor's data risk management capabilities. In other words, the implementation of the web-crawler or web-spider, the NLP modules and the AI/ML modules on a computer effectively transforms such a computer to a specialty machine that is particularly adept at evaluating the data risk management capabilities of the data processor.

The inventive ideas of the present disclosure are also integrated into a practical application, for example into the NLP modules and the AI/ML modules discussed above. Such a practical application can generate an output (e.g., whether a data processor possesses the requisite data risk management capability or not) that is easily understood by a human user, and it is useful in many contexts.

It should be appreciated that like reference numerals are used to identify like elements illustrated in one or more of the figures, wherein these labeled figures are for purposes of illustrating embodiments of the present disclosure and not for purposes of limiting the same.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
 a non-transitory memory; and
 a hardware processor coupled with the non-transitory memory and configured to read instructions from the non-transitory memory to cause the system to perform operations comprising:
  receiving a request including a query to evaluate a data risk management capability of a third-party to handle data of a second-party that has been provided to the third-party by a first-party, wherein the third-party is enabled to provide support services for the first-party;
  web-crawling, based on the received request, a World Wide Web and retrieving, from the World Wide Web, third-party data related to the data risk management capability of the third-party;
  parsing the retrieved third-party data to extract information responsive to the query of the request;
  performing a data risk assessment of the third-party based on the extracted information responsive to the query;
  providing the data of the second-party to the third-party based on the data risk assessment of the third-party;
  after an engagement of the third-party to provide support services for the first-party has ended, determining, at least in part via an access of an electronic storage of the third-party, whether the electronic storage contains personally identifying information of the second-party; and
  based on a determination that the electronic storage of the third-party contains personally identifying information of the second-party, generating a notice identifying the personally identifying information of the second-party for deletion on the electronic storage of the third-party.

2. The system of claim 1, wherein the third-party data includes a privacy policy statement of the of the third-party available on the World Wide Web related to the data risk management capability of the third-party.

3. The system of claim 1, wherein the parsing the retrieved third-party data includes performing natural language processing of the retrieved third-party data to identify the information responsive to the query of the request.

4. The system of claim 1, wherein the data risk assessment of the third-party is performed without input from a computing device of the third-party about the data risk management capability of the third-party.

5. The system of claim 1, wherein the data risk assessment of the third-party includes a third-party data risk rating evaluating the data risk management capability of the third-party, the operations further comprising:
providing the data of the second-party to the third-party if the third-party data risk rating is no less than a threshold data risk rating indicating a minimal third-party data risk management capability of the third-party.

6. The system of claim 1, wherein the data of the second-party is encrypted.

7. The system of claim 6, wherein the data of the second-party is encrypted asymmetrically with a keypair configured to expire within a pre-determined period.

8. A method, comprising:
receiving, by a system that includes a processor, a request including a query to evaluate a data risk management capability of a third-party to handle data of a second-party that has been provided to the third-party by a first-party, wherein the system is a system of the first-party different from the third-party, and wherein the third-party is enabled to provide support services for the first-party;
retrieving, via the system and based on the received request, third-party data related to the data risk management capability of the third-party from a data source, wherein the retrieving comprises web-crawling a World Wide Web;
parsing, via the system, the retrieved third-party data to extract information responsive to the query of the request;
performing, via the system, a data risk assessment of the third-party based on the extracted information responsive to the query;
generating, via the system, a third-party data risk rating evaluating the data risk management capability of the third-party based on the data risk assessment without input from a computing device of the third-party about the data risk management capability of the third-party;
after an engagement of the third-party to provide support services for the first-party has ended, determining, at least in part via an access of an electronic storage of the third-party, whether the electronic storage contains personally identifying information of the second-party; and
based on a determination that the electronic storage contains personally identifying information of the second-party, preventing the third-party from accessing the personally identifying information of the second-party and generating a notice identifying the personally identifying information of the second-party for deletion on the electronic storage of the third-party.

9. The method of claim 8, wherein the data source is a World Wide Web, and retrieving the third-party data includes web-spidering the World Wide Web.

10. The method of claim 8, wherein the third-party data includes a publicly available privacy policy statement of the of the third-party related to the data risk management capability of the third-party.

11. The method of claim 10, wherein the publicly available privacy policy statement includes an end user license agreement (EULA) of the third-party or a legal declaration of the third-party.

12. The method of claim 8, wherein the parsing the retrieved third-party data includes performing natural language processing of the retrieved third-party data to identify the information responsive to the query of the request.

13. The method of claim 8, wherein the first-party is entrusted with data of the second-party, the method further comprising:
providing, via the system, the data of the second-party to the third-party if the third-party data risk rating is no less than a threshold data risk rating indicating a minimal third-party data risk management capability.

14. The method of claim 13, wherein the data of the second-party is asymmetrically encrypted with a keypair configured to expire within a pre-determined period.

15. A non-transitory machine-readable medium having stored thereon machine-readable instructions executable to cause a machine to perform operations comprising:
receiving a request including a query to evaluate a data risk management capability of a third-party to handle data of a second-party that has been provided to the third-party by a first-party, wherein the third-party has been enabled to provide support services for the first-party;
crawling, based on the received request, a plurality of electronic websites;
accessing, based on the crawling, third-party data related to the data risk management capability of the third-party;
extracting information responsive to the query of the request at least in part by parsing the third-party data;
assessing a data risk of the third-party based on the extracted information;
transmitting the data of the second-party to the third-party based on the assessing of the data risk;
after the third-party has provided support services for the first-party, determining that an electronic storage of the third-party contains personally identifying information of the second-party; and
based on the determining, notifying the third-party to remove the personally identifying information of the second-party from the electronic storage of the third-party.

16. The non-transitory machine-readable medium of claim 15, wherein the third-party data includes a privacy policy statement of the of the third-party pertaining to the data risk management capability of the third-party.

17. The non-transitory machine-readable medium of claim 15, wherein the extracting the information is performed using one or more natural language processing techniques.

18. The non-transitory machine-readable medium of claim 15, wherein the assessing the data risk is performed without an input from a computing device of the third-party.

19. The non-transitory machine-readable medium of claim 15, wherein the data of the second-party is encrypted asymmetrically with a keypair configured to expire within a pre-determined period.

20. The non-transitory machine-readable medium of claim 15, wherein the operations further comprise determining that a third-party data risk rating is no less than a predefined threshold, wherein the transmitting is performed based on the determining that the third-party data risk rating is no less than a predefined threshold.

* * * * *